Figure 1:

March 7, 1967 R. R. S. HAMMEBORG ET AL 3,307,258

SHEET METAL PLIER TOOL WITH INTERFOLIATED PIVOT JOINT

Filed March 11, 1965 2 Sheets-Sheet 1

INVENTORS
RUNE R. S. HAMMEBORG
INGE PILSKAR

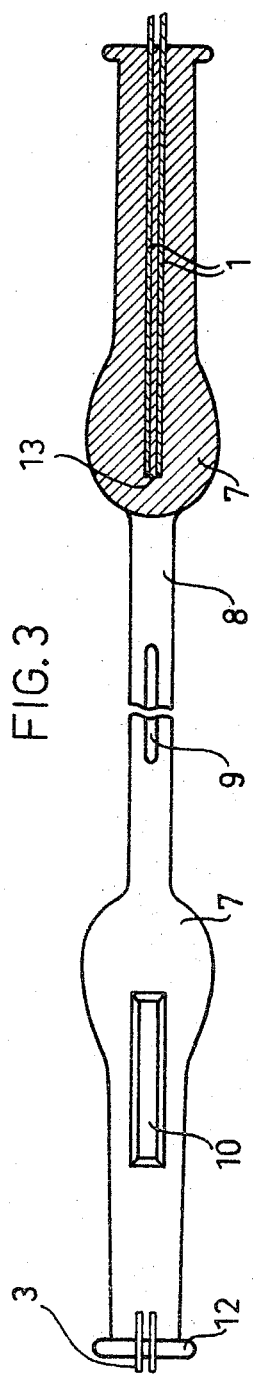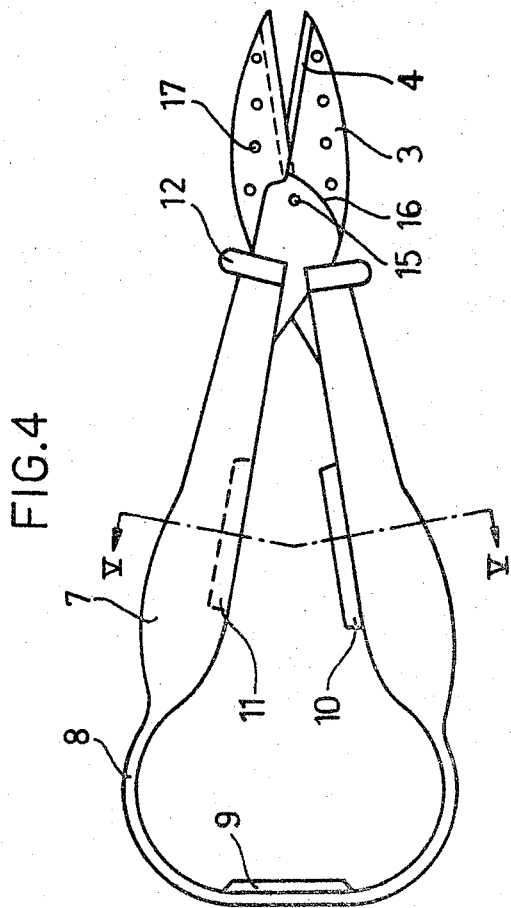

United States Patent Office 3,307,258
Patented Mar. 7, 1967

3,307,258
SHEET METAL PLIER TOOL WITH INTERFOLIATED PIVOT JOINT
Rune Rolf Sigvard Hammeborg, Huddinge, and Inge Pilskär, Enskede, Sweden, assignors to Skandinaviska Telekompaniet AB, Stockholm, Sweden
Filed Mar. 11, 1965, Ser. No. 438,984
Claims priority, application Sweden, Mar. 19, 1964, 3,402/64
4 Claims. (Cl. 30—261)

The present invention relates to scissors, tongs, pliers or the like.

Scissors, tongs, pliers or the like of conventional types consist of two legs or shanks, which are articulated together at one point. Each shank is usually made from a blank by forging and grinding. The shanks are usually joined together by a rivet or a screw. Such a screw can be threaded in one of said shanks and run freely through the other, or it may run freely through both shanks and be provided with a nut to keep it in place. It is not possible to make the joint quite tight and, therefore, the scissors' blades have to be slightly bent towards each other for avoiding a gap between the edges.

In case of a pair of tongs or pliers, one of the shanks is usually opened to form an eye which is big enough to allow the jaw of the other shank to be inserted therein, whereafter the eye has to be closed around the inserted shank by forging. Thereafter, the shanks are articulated to each other by a rivet. After the forging the jaws have to be hardened and ground.

The manufacture of scissors and tongs or the like of the type indicated above involves a lot of manual work and is, therefore, expensive.

A main object of the present invention is to provide a pair of scissors, tongs, pliers or the like, whose manufacture may be carried out with very little manual work using tools as well as material which are less expensive than those used for the production of scissors or the like of conventional types.

A further object of the invention is to provide a pair of scissors, tongs, pliers or the like in which the jaws are guided more steadily against each other than in scissors or the like of conventional type.

A still further object of the invention is to provide a pair of scissors, tongs, pliers or the like, in which the jaw portions are held apart by a bendable strap which is integral with the handle portions of the tool, so that the tool is always ready for use.

According to a preferred embodiment of the invention a pair of scissors, tongs, pliers and the like comprises two shanks which are articulated to each other, each shank comprising a jaw portion located at one side of the articulation joint and a shaft portion located at the other side of the articulation joint, each shank consisting of two blanks of sheet steel, the two blanks of each shank enclosing between them at the articulation joint one blank of the other shank, the jaw portion of the outermost blank of each shank being bent inwards towards the jaw portion of the other blank of the same shank and firmly joined thereto.

Figure 2:
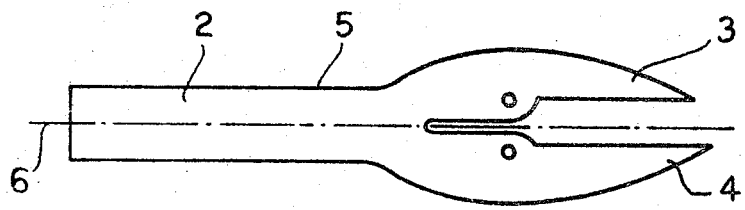
Figure 5:
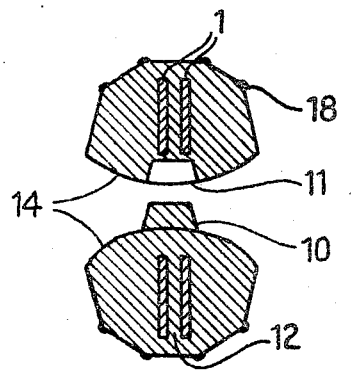

With the above and other objects in view the invention will be described more in detail with reference to the accompanying drawings in which:

FIGURE 1 is a side view of a punched-out blank for one part of a shank of a pair of scissors, FIGURE 2 is a side view of two punched-out blanks, which are integral with each other, said blanks providing two parts of a shank of a pair of scissors, FIGURE 3 is a plan view with parts in section illustrating how two shanks of a pair of scissors may be joined together by a thermoplastic material before being articulated to each other, according to one embodiment of the invention, FIGURE 4 is a side elevation of a pair of scissors according to the invention, and FIGURE 5 is a cross section taken upon section line V—V of FIGURE 4.

In FIGURE 1 a blank 1 for one part of a shank is illustrated, said blank having a shaft portion 2 and a jaw portion 3. For a pair of pincers or the like four such similar blanks are required. Two blanks are used for each shank. For a pair of scissors, the jaw portion of one of the blanks for each shank should be broader than the jaw portion of the other.

The two blanks of each shank may also be made in one piece as illustrated in FIG. 2. In that case, the two blanks are folded to be parallel with each other along the dash-dotted line 6.

The jaw portions of the blanks are pressed together, which may be done by stamping one part along the line 16 illustrated in FIGURE 4. The blanks are then fastened to each other by, for example, point-welding, which is illustrated at 17 in FIGURE 4. Thus, the jaw portions of the two blanks belonging to each shank form one jaw member of the pair of scissors or tongs. In case of a pair of scissors, as illustrated in FIGURE 4, the blank 3 is the outermost blank of each shank. The cutting bits are provided on the innermost blank 4 of each shank. Said innermost blank of each shank is enclosed, at the articulation joint, by the two blanks of the other shank.

In case of a pair of tongs or the like, the jaw parts of the two blanks for each shank are of equal size. Also in this case the jaw part of the outermost blank of each shank is stamped along the line 16 of FIGURE 4, and joined to the jaw part of the other blank of the same shank, so that the jaw parts of the two blanks form together one clamping jaw of the tongs. The arrangement is such, that the clamping surface of the outermost blank of each shank will cooperate with the clamping surface of the innermost blank or the other shank. Thus, the clamping surface of each jaw member has a width, which is equal to the double thickness of each blank.

In case the two blanks of a shank are punched out in one piece as illustrated in FIGURE 2, the jaw portions 3 and 4 of one shank (after folding the blank along the line 6 as previously described) are interfoliated with the corresponding jaw portions of the other shank prior to the stamping of the jaw portions.

In case each shank is assembled from two separate blanks of the type illustrated in FIGURE 1, the interfoliation of the blanks may take place after the blanks have been stamped (along the line 16 of FIGURE 4) and welded together in pairs to form two shanks. This is sometimes preferred, as the welded shanks have to be hardened and ground after the welding, and sometimes covered by a protecting layer of nickel or the like This is easier to do before the interfoliation of the blanks and the connecting of the shanks at the articlulation joint.

After the interfoliation of the different parts of the shanks, whereby one part of each shank is inserted between the two parts of the other shank, the two shanks are connected together by the articulation joint. Said connection may be made by means of a screw or a rivet 15 which is inserted through the holes of all interfoliated shanks and locked in place in any suitable way.

Prior to or after the assembling of the shanks, the shaft parts of the shanks may be provided with handle portions, such as the portions 7 in FIG. 4. Said handle portions may be moulded from synthetic resin of any suitable kind.

According to one embodiment of the invention, the shanks, prior to their interfoliation, may be placed in a mold, on a substantially straight line, as shown in FIG. 3, with their shaft portions pointing towards each other. Thereafter, the handle portions are moulded in said mold, so that the shaft parts of the two blanks forming each shank are embedded in the handle portion and kept firmly together.

In the embodiment shown in FIGURES 3 and 4, the handle portions are connected to each other by a bendable part 8 of the same material as that in the handle portions. There is a ridge 9 provided on the bendable part 8 (FIGURE 4). The bendable part 8 with its stiffening ridge 9 is moulded in a channel between the cavities for moulding the handle portions and serves as a spring to keep the shaft parts of the pair of scissors separated, and the jaw parts open. By this means, the scissors are convenient to operate by simply pressing the shaft parts together by the hand or the fingers. This is a very convenient way of handling the tool.

If, for example, a pair of pliers are used for holding small electronic components, while such components are assembled in an electronic circuit, the pair of pliers may be held between the thumb and two other fingers of the right hand and a soldering iron by the left hand. The gripping of new components is very much facilitated when the pair of pliers open automatically under the action of the spring which is formed by the bendable part 8 and its stiffening ridge 9.

Further, there is a ridge 10 on one of the handle portions 7 which is adapted to fit in a recess 11 provided in the other handle portions, said ridge and recess serving the purpose of guiding the shanks against each other during the last part of the movement of the scissors towards each other.

The surfaces 14 of the handle portions 7 which face each other are rounded off as clearly shown in FIGURE 5, in order to avoid pinching the skin of the operator between the edges of the handle portions.

Each handle portion 7 has a flange 12 (FIGURES 3 and 4). The purpose of this flange is to keep the shafts of the scissors or tongs lifted from the table (or other surface on which they may be placed) so as to facilitate picking up the tool when desired.

It should be appreciated, that a pair of scissors, tongs, pliers or the like according to the invention may be made merely by punching and stamping, and that manual work is practically eliminated. Further, the articulating joint of a pair of scissors or tongs according to the present invention comprises two interfoliated parts, which gives a very good guiding of the jaws against each other.

We claim:

1. A tool comprising two shanks articulated to one another at a joint, each shank comprising a jaw portion located at one side of said joint and a shaft portion located at the other side of said joint, each shank consisting of two blanks of sheet metal enclosing between them at said joint one blank of the other shank, the jaw portion of the outermost blank of each shank being bent inwardly towards the jaw portion of the other blank of the same shank and firmly joined thereto.

2. A tool as claimed in claim 1, wherein the blanks of each shank, at the shaft portion thereof, are secured together by a handle of synthetic resin, and said handles for the two shanks are connected together by a bendable, arc-shaped connection strip integral with said handles to serve as a spring to keep said jaw portions open and ready for use.

3. A tool as claimed in claim 1, wherein said jaw portions of the blanks of each shank are fixed to each other by welding.

4. A tool as claimed in claim 1, wherein said shaft portions of the two blanks belonging to each shank are integral at one side, and are bent together along a fold at said side, and separated from each other at the portion where said joint is located.

References Cited by the Examiner
UNITED STATES PATENTS

| | | | |
|---|---|---|---|
| 550,483 | 11/1895 | Carrier | 294—118 X |
| 664,613 | 12/1900 | Badger | 30—261 |
| 672,654 | 4/1901 | Sperry et al. | 81—416 |
| 1,929,351 | 10/1933 | Cunningham | 30—343 |
| 2,382,304 | 8/1945 | Foltz et al. | 30—343 |
| 3,003,236 | 10/1961 | Castelli | 30—254 X |

WILLIAM FELDMAN, *Primary Examiner.*

GRANVILLE Y. CUSTER, JR., *Examiner.*

J. C. PETERS, *Assistant Examiner.*